(12) United States Patent
Donnelli et al.

(10) Patent No.: US 7,849,679 B2
(45) Date of Patent: Dec. 14, 2010

(54) FUEL DELIVERY SYSTEM HAVING MULTI-OUTPUT PUMP

(75) Inventors: Drew Christopher Donnelli, Edwards, IL (US); Ye Tian, Bloomington, IL (US); Joseph Shane Burkitt, Edwards, IL (US)

(73) Assignee: Caterpillar Inc, Peoria, IL (US)

( * ) Notice: Subject to any disclaimer, the term of this patent is extended or adjusted under 35 U.S.C. 154(b) by 57 days.

(21) Appl. No.: 12/314,133

(22) Filed: Dec. 4, 2008

(65) Prior Publication Data

US 2010/0139619 A1  Jun. 10, 2010

(51) Int. Cl.
*F01N 3/00* (2006.01)
*F02M 69/04* (2006.01)

(52) U.S. Cl. .......... 60/295; 123/445; 123/495; 417/286; 417/303

(58) Field of Classification Search .......... 123/445, 123/446, 447, 495; 60/295, 303; 417/286
See application file for complete search history.

(56) References Cited

U.S. PATENT DOCUMENTS

| | | | |
|---|---|---|---|
| 796,724 A | 8/1905 | Hewitt | |
| 2,955,536 A | 10/1960 | Gaubatz | |
| 2,955,537 A | 10/1960 | Gaubatz | |
| 2,972,952 A | 2/1961 | Murray | |
| 3,105,441 A | 10/1963 | Grill et al. | |
| 3,827,836 A | 8/1974 | Scheibe | |
| 3,916,767 A * | 11/1975 | Barton | 91/516 |
| 3,981,288 A * | 9/1976 | Wessel | 123/482 |
| 4,277,230 A | 7/1981 | Müller | |
| 4,467,627 A * | 8/1984 | Platt et al. | 68/17 R |
| 4,728,271 A | 3/1988 | Harwath | |
| 4,930,994 A * | 6/1990 | Budecker | 417/286 |
| 5,435,130 A * | 7/1995 | Kroiss et al. | 60/300 |
| 5,496,163 A | 3/1996 | Griese et al. | |
| 6,206,666 B1 | 3/2001 | Steinrock et al. | |
| 6,253,735 B1 | 7/2001 | Miyajima | |
| 6,481,991 B2 | 11/2002 | Takagi et al. | |
| 6,761,547 B2 | 7/2004 | Takagi et al. | |
| 6,834,496 B2 * | 12/2004 | Nakatani et al. | 60/274 |
| 6,922,988 B2 * | 8/2005 | Yamaguchi et al. | 60/286 |
| 7,069,721 B2 * | 7/2006 | Gotou | 60/297 |
| 7,150,268 B2 | 12/2006 | Shafer et al. | |
| 7,334,399 B2 * | 2/2008 | Carroll et al. | 60/286 |
| 7,353,800 B2 | 4/2008 | Gibson | |
| 2008/0209895 A1 * | 9/2008 | Miller et al. | 60/295 |
| 2008/0245058 A1 * | 10/2008 | Boddy et al. | 60/286 |
| 2009/0025685 A1 * | 1/2009 | Einberger et al. | 123/447 |

* cited by examiner

*Primary Examiner*—Thomas N Moulis
(74) *Attorney, Agent, or Firm*—Finnegan, Henderson, Farabow, Garrett & Dunner LLC; Carl E. Myers

(57) ABSTRACT

A fuel delivery system for a combustion engine is provided. The fuel delivery system includes an exhaust treatment device, a fuel injection unit, a fuel supply, and a fuel pump. The fuel pump includes at least one inlet configured to receive fuel from the fuel supply. A first fixed-output pumping element is configured to generate a first fuel flow at a first pressure and a first flow rate. A second fixed-output pumping element is configured to generate a second fuel flow at a second pressure and a second flow rate. At least one of the second pressure and the second flow rate is different from the first pressure and the first flow rate. A first outlet is configured to direct the first fuel flow to the fuel injection unit. A second outlet is configured to direct the second fuel flow to the exhaust treatment device.

20 Claims, 2 Drawing Sheets

FUEL DELIVERY SYSTEM HAVING MULTI-OUTPUT PUMP

TECHNICAL FIELD

The present disclosure is directed to a fuel delivery system and, more particularly, to a fuel delivery system having a multi-output pump.

BACKGROUND

Operation of an internal combustion engine, for example a diesel, gasoline, or gaseous fuel-powered engine, can cause the generation of undesirable emissions. These emissions, which may include particulates, oxides of nitrogen (NOx), and oxides of sulfur (SOx), are generated when fuel is combusted within a combustion chamber of the engine. If no emission reduction measures are in place, these undesirable emissions will eventually be exhausted to the environment.

Many different approaches, such as exhaust aftertreatments, have been developed to reduce the amount of emissions discharged during the operation of an engine. Some exhaust aftertreatments require periodic regeneration to prolong their use. Aftertreatment regeneration can require incremental fueling in the form of late post injections, which require additional capacity of the engine's fuel delivery system.

Historically, a single fuel transfer pump has been used to provide fuel for both the combustion within the engine and for aftertreatment regeneration. Although effective, the pressure and flow rate requirements for the engine combustion and the aftertreatment regeneration can vary drastically. Specifically, engine combustion requires a fuel flow of a relatively lower pressure and a relatively larger flow rate compared to aftertreatment regeneration. In order to meet the requirements of both systems, the operating conditions of the fuel transfer pump may be frequently switched between different states, for example, from a high-pressure state to a low-pressure state. Operating under these different conditions can cause early failure of the transfer pump and result in increased maintenance cost and lower efficiency.

One example of a single pump that can provide substantially different flows is described in U.S. Pat. No. 7,150,268 (the '268 patent) issued to Shafer et al. on Dec. 19, 2006. In particular, the '268 patent discloses a fuel pumping system having commonly housed first and second pumping elements, each configured to output a flow of fuel at a variable pressure and a variable flow rate. The flows from the first and second pumping elements are both directed to separate manifolds of an engine. While the fuel pumping system of the '268 patent may allow for variable fuel pumping to two separate locations, such a fuel pumping system may be overly complex and expensive.

The fuel delivery system of the present disclosure is directed toward improvements in the existing technology.

SUMMARY

One aspect of the present disclosure is directed to a fuel delivery system for a combustion engine. The fuel delivery system includes an exhaust treatment device, a fuel injection unit configured to direct fuel into the combustion engine, a fuel supply, and a fuel pump. The fuel pump includes at least one inlet configured to receive fuel from the fuel supply, a first fixed-output pumping element and a second fixed-output pumping element. The first fixed-output pumping element is configured to generate a first fuel flow at a first pressure and a first flow rate. The second fixed-output pumping element is configured to generate a second fuel flow at a second pressure and a second flow rate. At least one of the second pressure and the second flow rate is different from the first pressure and the first flow rate. A first outlet is configured to direct the first fuel flow to the fuel injection unit. A second outlet is configured to direct the second fuel flow to the exhaust treatment device.

Another aspect of the present disclosure is directed to a method of supplying fuel to a combustion engine and an exhaust treatment device. The method includes generating a rotational output, and directing the rotational output to create a first flow of pressurized fuel having a pressure and flow rate, and a second flow of pressurized fuel having a pressure and flow rate different from the pressure and flow rate of the first flow of pressurized fuel. The method also includes directing the first flow of pressurized fuel to the combustion engine, and directing the second flow of pressurized fuel to the exhaust treatment device.

DETAILED DESCRIPTION

Figure 1:
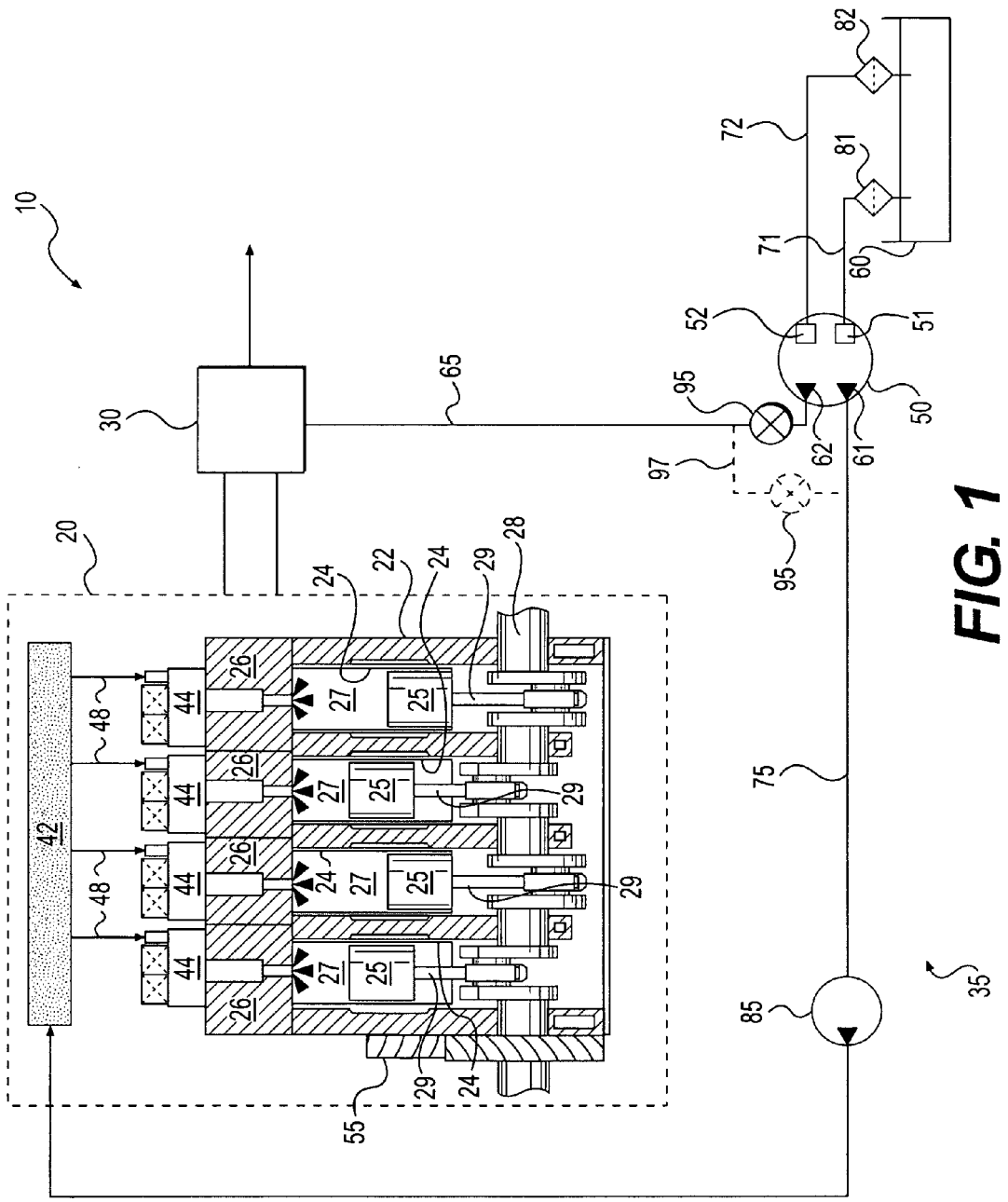
FIG. 1 is a schematic illustration of an exemplary disclosed engine system.

An exemplary embodiment of an engine system 10 is illustrated in FIG. 1. Engine system 10 may include a combustion engine 20 and an exhaust treatment device 30. For the purposes of this disclosure, combustion engine 20 is depicted and described as a four-cylinder engine. One skilled in the art will recognize, however, that combustion engine 20 may include any suitable number of cylinders, and may be any type of combustion engine such as, for example, a gasoline, a diesel, or a gaseous fuel-powered engine.

Exhaust treatment device 30 may be configured to treat the exhaust from combustion engine 20. For example, exhaust treatment device 30 may be a diesel particulate filter configured to remove diesel particulate matter from the exhaust. A fuel-fired burner may be associated with the diesel particulate filter and be configured to burn fuel to promote regeneration of the diesel particulate filter. Fuel may be injected into exhaust upstream of exhaust treatment device 30 during a regeneration event. Exhaust treatment device 30 may also embody or alternatively be a catalyst substrate configured to reduce exhaust constituents such as NOx and/or SOx from the exhaust in the presence of the fuel.

As illustrated in FIG. 1, combustion engine 20 may include an engine block 22 that at least partially defines one or more cylinders 24. A piston 25 may be slidably disposed within each cylinder 24. Combustion engine 20 may also include a cylinder head 26 associated with each cylinder 24. Each cylinder 24, piston 25, and cylinder head 26 may form a combustion chamber 27. In the illustrated embodiment, combustion engine 20 may include four combustion chambers 27. One skilled in the art will readily recognize that combustion engine 20 may include a greater or lesser number of combustion chambers 27 and that combustion chambers 27 may be disposed in an "in-line" configuration, a "V" configuration, or in any other conventional configuration.

As also shown in FIG. 1, combustion engine 20 may include a crankshaft 28 that is rotatably disposed within engine block 22. A connecting rod 29 may connect each piston 25 to crankshaft 28. Each piston 25 may be coupled to crankshaft 28 so that a sliding motion of piston 25 within the respective cylinder 24 may result in a rotation of crankshaft 28. Conversely, a rotation of crankshaft 28 may result in a sliding motion of piston 25.

Combustion engine 20 may include one or more fuel injection units 44, each being disposed within an associated cylinder head 26 to inject pressurized fuel into a respective combustion chamber 27. Each of fuel injection units 44 may be mechanically, electrically, or hydraulically operated. Combustion engine 20 may include a common rail 42 and fuel injection units 44 may be fluidly connected with common rail 42 through a plurality of fuel lines 48.

As shown in FIG. 1, a fuel delivery system 35 may be configured to supply fuel to combustion engine 20. Fuel delivery system 35 may include a fuel supply 60 and a fuel supply line 75 extending from fuel supply 60 to common rail 42 of combustion engine 20. A fuel pump 50 may be disposed within fuel supply line 75, and be operably connected to combustion engine 20 and driven by crankshaft 28. Fuel pump 50 may be connected with crankshaft 28 in any manner readily apparent to one skilled in the art where a rotation of crankshaft 28 will result in a corresponding rotation of a pump drive shaft (only shown in FIG. 2) disposed within fuel pump 50. For example, fuel pump 50 may be connected to crankshaft 28 through a gear train 55. It is contemplated that fuel pump 50 may be driven by other power sources known in the art.

Fuel pump 50 may be configured to draw fuel from fuel supply 60, increase the pressure of the fuel, and generate two or more fuel flows directed to fuel injection units 44 and exhaust treatment device 30. Fuel pump 50 may include at least one inlet configured to receive fuel from fuel supply 60. In some embodiments, fuel pump 50 may include a first inlet 51 and a second inlet 52. First inlet 51 may be connected with fuel supply 60 through a fuel line 71, and a first filter 81 may be disposed within fuel line 71. Second inlet 52 may be connected with fuel supply 60 through a fuel line 72, and a second filter 82 may be disposed in fuel line 72. Alternatively, it is contemplated that the first and second inlets 51 and 52 may be connected to fuel supply 60 through a common fuel line (not shown), which may include a common filter (not shown), if desired. It is also contemplated that in some embodiments, fuel pump 50 may include a single inlet (not shown) connected with fuel supply 60 through a single fuel line (not shown).

Fuel pump 50 may also include a first outlet 61 configured to direct a first fuel flow to fuel injection units 44 via fuel supply line 75, and a second outlet 62 configured to direct a second fuel flow to exhaust treatment device 30 via a fuel line 65. First outlet 61 may be fluidly connected with first inlet 51, while second outlet 62 may be fluidly connected with second inlet 52.

In some embodiments, a high-pressure pump 85 may be disposed within fuel supply line 75 between fuel injection units 44 and fuel pump 50. High-pressure pump 85 may be configured to pressurize the fuel received from fuel pump 50 to a relatively higher level, and deliver the high-pressure fuel to common rail 42. Although not shown in FIG. 1, it is contemplated that one or more filters may be disposed within fuel supply line 75, for example, at locations upstream or downstream of high-pressure pump 85.

Fuel delivery system 35 may also include a valve 95 configured to selectively control the second fuel flow directed to exhaust treatment device 30. Valve 95 may selectively control at least one of the pressure and the flow rate of the second fuel flow. Valve 95 may be an electrically-controlled solenoid valve communicating with for example, an existing engine control module 200 (shown only in FIG. 2). Valve 95 may be disposed at various locations within fuel delivery system 35. For example, in one embodiment, valve 95 may be disposed within fuel line 65. In this location, valve 95 may be selectively opened or closed to allow or inhibit the second fuel flow directed to exhaust treatment device 30 through fuel line 65. In another embodiment, valve 95 may be disposed within a bypass fuel line 97 connecting second outlet 62 with first outlet 61. As shown in FIG. 1, bypass fuel line 97 may be interposed between a portion of fuel line 65 downstream of second outlet 62 and a portion of fuel supply line 75 downstream of first outlet 61. In this location, valve 95 may be selectively opened or closed to allow or inhibit the second fuel flow to be directed from second outlet 62 to a location within fuel supply line 75 downstream of first outlet 61. Thus, when valve 95 is opened, a portion of the second fuel flow directed to exhaust treatment device 30 may be redirected to combustion engine 20. In yet another embodiment, valve 95 may be integral within fuel pump 50, as will be discussed below. Other configurations are also contemplated.

Figure 2:
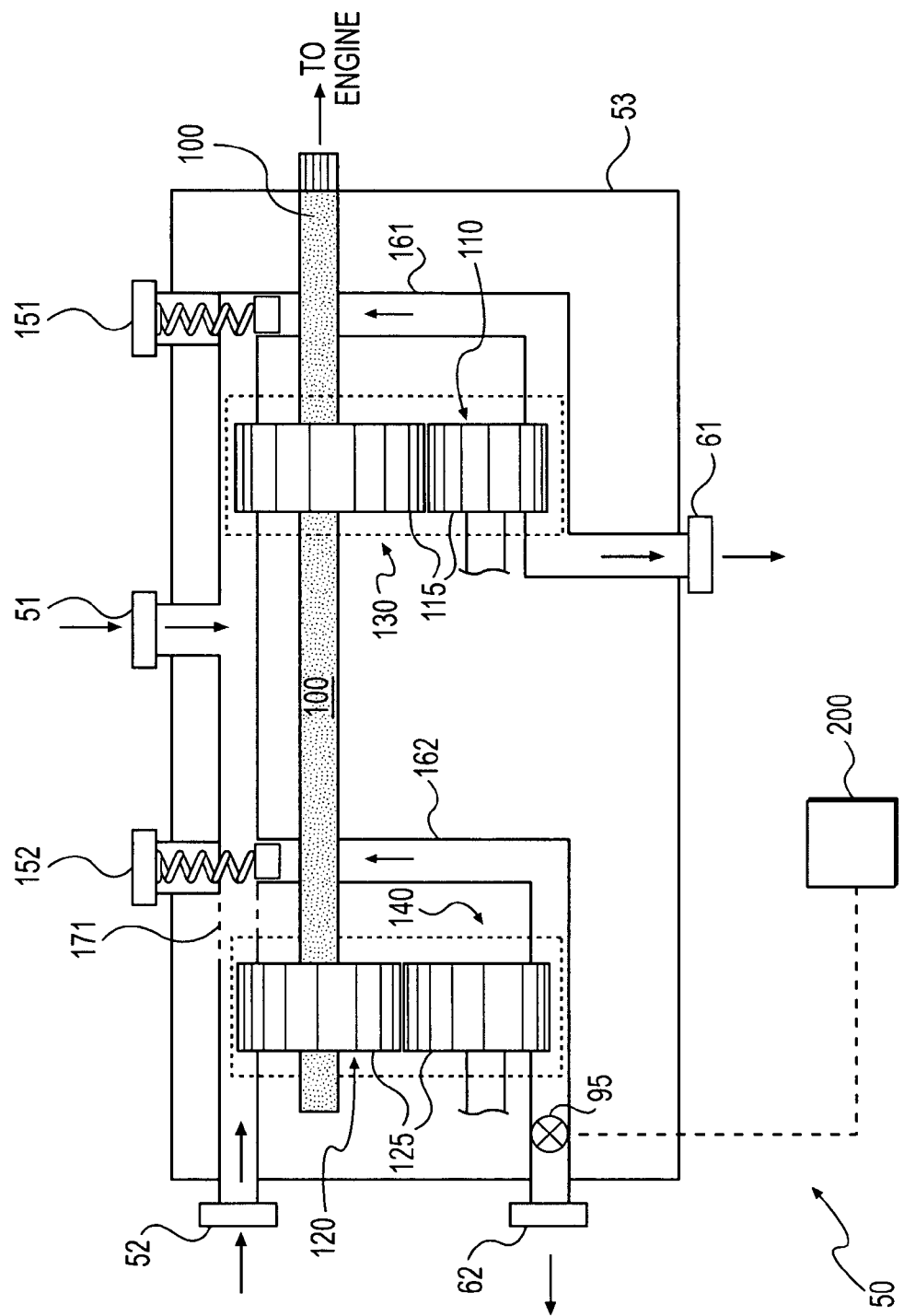
FIG. 2 illustrates an exemplary disclosed pump that may be employed in the engine system of FIG. 1.

As illustrated in FIG. 2, fuel pump 50 may include a housing 53. A pump drive shaft 100 may be at least partially disposed within housing 53. Pump drive shaft 100 may be operably coupled with gear train 55 of combustion engine 20 (referring to FIG. 1). In this configuration, fuel pump 50 may be driven by gear train 55 when combustion engine 20 is operating.

Housing 53 may include a first pumping chamber 130 and a second pumping chamber 140. First and second pumping chambers 130 and 140 may be fluidly separated from one another. Fuel pump 50 may include a first fixed-output pumping element 110, which may be disposed within first pumping chamber 130, and a second fixed-output pumping element 120, which may be disposed within second pumping chamber 140.

First fixed-output pumping element 110 may be configured to generate a first fuel flow at a first pressure and a first flow rate, while second fixed-output pumping element 120 may be configured to generate a second fuel flow at a second pressure and a second flow rate. At least one of the second pressure and the second flow rate may be different from the first pressure and the first flow rate. The first fuel flow may be a substantially constant flow having a substantially constant first pressure and a substantially constant first flow rate. Similarly, the second fuel flow may be a substantially constant flow having a substantially constant second pressure and a substantially constant second flow rate.

First fixed-output pumping element 110 may be a gear type pumping element and may include a first gear set 115. Similar to first fixed-output pumping element 110, second fixed-output pumping element 120 may be a gear type pumping element and may include a second gear set 125. First and second gear sets 115 and 125 may both be coupled with pump drive shaft 100 and driven to rotate simultaneously by pump drive shaft 100. In such an embodiment, pump drive shaft 100 may operably couple combustion engine 20 with first and second gear sets 115 and 125. It is contemplated that first and second gear sets 115 and 125 may have differently sized gears, so that each gear set may pump fuel at a different desired pressure and desired flow rate.

First gear set 115 may be disposed within first pumping chamber 130, while second gear set 125 may be disposed within second pumping chamber 140. First pumping chamber 130 may communicate with first inlet 51 to receive fuel, and with first outlet 61 to discharge fuel after the fuel is acted on by first gear set 115. Second pumping chamber 140 may communicate with second inlet 52 to receive fuel, and with second outlet 62 to discharge fuel after the fuel is acted on by second gear set 125. First gear set 115 may be configured to pressurize the fuel received from first inlet 51 and to generate the first fuel flow. Second gear set 125 may be configured to pressurize the fuel received from second inlet 52 and to generate the second fuel flow.

Fuel pump 50 may include a first bypass fuel passage 161 fluidly connecting first inlet 51 with first outlet 61. Fuel pump 50 may also include a second bypass fuel passage 162 fluidly connecting second outlet 62 with first inlet 51. In some embodiments, fuel pump 50 may include a fuel passage 171 fluidly connecting first inlet 51 with second inlet 52.

Fuel pump 50 may also include at least one pressure relief valve configured to relieve the pressure of the fuel directed to at least one of first and second outputs 61 and 62. In some embodiments, fuel pump 50 may include a first pressure relief valve 151 associated with first bypass fuel passage 161, and a second pressure relief valve 152 associated with second bypass fuel passage 162.

First pressure relief valve 151 may be configured to relieve a pressure of the first fuel flow directed from first gear set 115 to first outlet 61. For example, when the pressure of the first fuel flow directed to first outlet 61 exceeds a first predetermined pressure, first pressure relief valve 151 may be opened to direct at least a portion of the fuel flow output from first pumping chamber 130 through first bypass fuel passage 161, thereby reducing the pressure of first fuel flow directed through first outlet 61.

Similarly, second pressure relief valve 152 may be configured to relieve a pressure of the second fuel flow directed from second gear set 125 to second outlet 62. For example, when the pressure of the second fuel flow directed to second outlet 62 exceeds a second predetermined pressure, second pressure relief valve 152 may be opened. At least a portion of the fuel flow output from second pumping chamber 140 may be directed to first inlet 51 via second bypass fuel passage 162, and/or to second inlet 52 though second bypass fuel passage 162 and fuel passage 171.

In the embodiment of FIG. 2, valve 95 is shown as being integral with fuel pump 50. Valve 95 may be at least partially disposed within housing 53 of fuel pump 50, and may be an electrically-controlled solenoid valve associated with engine control module 200. Engine control module 200 may selectively open valve 95 to allow the second fuel flow to be directed from second pumping chamber 140 to second outlet 62, which may be subsequently directed to exhaust treatment device 30. Engine control module 200 may selectively close valve 95 to inhibit the second fuel flow directed to second outlet 62.

INDUSTRIAL APPLICABILITY

The fuel delivery system of the present disclosure has wide application in a variety of engine types including, for example, diesel engines, gasoline engines, and gaseous fuel-powered engines. The described fuel delivery system may deliver substantially separate fuel flows to the disclosed combustion engine and exhaust treatment device in a simple and cost-effective manner.

Referring to FIGS. 1 and 2, the operation of combustion engine 20 may cause a rotation of crankshaft 28, which may result in a rotation of pump drive shaft 100. The rotation of pump drive shaft 100 may cause an associated pumping action of first and second fixed-output pumping elements 110 and 120. Fuel may be withdrawn from fuel supply 60 into first pumping chamber 130 through first inlet 51, and into second pumping chamber 140 through second inlet 52. The rotation of first and second gear sets 115 and 125 may generate the first flow of pressurized fuel having a substantially constant pressure and flow rate, and the second flow of pressurized fuel having a substantially constant pressure and flow rate different from the pressure and flow rate of the first flow of pressurized fuel.

Fuel received from inlet 51 may flow through first pumping chamber 130 and be pressurized by the rotational pumping action of first gear set 115. The pressurized fuel may be directed to first outlet 61 to create the first fuel flow having a substantially constant first pressure and first flow rate. Similarly, fuel received from second inlet 52 may flow through second pumping chamber 140 and be pressurized by the rotational pumping action of second gear set 125. The pressurized fuel from second pumping chamber 140 may be directed to second outlet 62 to create a second fuel flow having a substantially constant second pressure and second flow rate. The first fuel flow may be subsequently directed to fuel injection units 44 of combustion engine 20 through first outlet 61, while second fuel flow may be directed to exhaust treatment device 30 through second outlet 62.

High-pressure pump 85 may increase the pressure of the first fuel flow received from fuel pump 50 to a relatively higher level, and may direct the first constant fuel flow to common rail 42. Common rail 42 may distribute fuel to fuel injection units 44 through fuel lines 48. Fuel injection units 44 may inject the fuel into combustion chambers 27 for combustion.

Burning fuel within combustion engine 20 may produce exhaust. Exhaust may be treated by exhaust treatment device 30. Exhaust treatment device 30 may need to be regenerated regularly. To regenerate exhaust treatment device 30, fuel may be injected into a fuel-fired burner associated with exhaust treatment device 30, and burned to provide a sufficient temperature that promotes regeneration. The injection of fuel into exhaust treatment device 30 may require a fuel flow with a flow rate and/or pressure different from that provided to combustion engine 20 for combustion within cylinders 24.

Fuel may only be injected into exhaust treatment device 30 when needed, for example, during a regeneration event. Thus, a controller, for example, engine control module 200, may be used to control valve 95 to selectively restrict the second fuel flow directed to exhaust treatment device 30. For example, when a regeneration event requires a positive fuel flow, valve 95 may be selectively opened to allow the second fuel flow to be directed to exhaust treatment device 30 via fuel line 65. When fuel is not required by exhaust treatment device 30, valve 95 may be selectively closed to inhibit the second fuel flow within fuel line 65. In this manner, the output of second fixed-output pumping element 120 may help supplement output of first fixed-output pumping element 110 during non-regeneration events.

When located within bypass fuel line 97, valve 95 may alternatively be used to selectively direct a portion of the second flow of pressurized fuel from second outlet 62 of fuel pump 50 to fuel supply line 75. In this manner, at least one of the flow rate and the pressure of the second fuel flow directed to exhaust treatment device 30 may be reduced, while supplementing the first fuel flow. In such embodiments, the pressure of the second fuel flow directed to exhaust treatment device 30 may be reduced to a sufficiently low level such that the fuel is inhibited from passing to exhaust treatment device 30.

It will be apparent to those skilled in the art that various modifications and variations can be made in the fuel delivery system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the invention being indicated by the following claims and their equivalents.

What is claimed is:

1. A fuel delivery system for a combustion engine, comprising:
   an exhaust treatment device;
   a fuel injection unit configured to direct fuel into the combustion engine;
   a fuel supply; and
   a fuel pump including:
     at least one inlet configured to receive fuel from the fuel supply;
     a first fixed-output pumping element configured to generate a first fuel flow at a first pressure and a first flow rate;
     a second fixed-output pumping element configured to generate a second fuel flow at a second pressure and a second flow rate, at least one of the second pressure and the second flow rate being different from the first pressure and the first flow rate;
     a first outlet configured to direct the first fuel flow to the fuel injection unit; and
     a second outlet configured to direct the second fuel flow to the exhaust treatment device.

2. The fuel delivery system of claim 1, wherein the at least one inlet includes a first inlet fluidly connected with the first fixed-output pumping element and a second inlet fluidly connected with the second fixed-output pumping element.

3. The fuel delivery system of claim 1, wherein the first fixed-output pumping element includes a first gear set.

4. The fuel delivery system of claim 3, wherein the second fixed-output pumping element includes a second gear set.

5. The fuel delivery system of claim 4, wherein the first gear set is disposed within a first pumping chamber, and the second gear set is disposed within a second pumping chamber.

6. The fuel delivery system of claim 5, wherein the first pumping chamber and the second pumping chamber are included within a housing of the fuel pump.

7. The fuel delivery system of claim 1, further including a valve disposed within a fuel line extending from the second outlet of the fuel pump to the exhaust treatment device, and being configured to selectively control the second fuel flow directed to the exhaust treatment device through the fuel line.

8. The fuel delivery system of claim 1, further including a bypass fuel line connecting the second outlet with the first outlet.

9. The fuel delivery system of claim 8, wherein the bypass fuel line is interposed between a portion of a fuel line extending from the second outlet to the exhaust treatment device and a portion of a fuel supply line downstream of the first outlet.

10. The fuel delivery system of claim 8, further including a valve disposed within the bypass fuel line and being configured to selectively allow or inhibit a portion of the second fuel flow to be directed from the second outlet to a location within the fuel supply line downstream of the first outlet.

11. The fuel delivery system of claim 1, wherein the fuel pump further includes a pump drive shaft operably coupled with the first and the second fixed-output pumping elements.

12. The fuel delivery system of claim 1, wherein the at least one inlet includes a first inlet and a second inlet, and the fuel pump further includes:
   a first fuel passage interposed between the first inlet and the first outlet, and being configured to direct at least a portion of the first fuel flow from the first outlet to the first inlet; and
   a first pressure relief valve associated with the first fuel passage and being configured to selectively allow or inhibit the portion of the first fuel flow to be directed from the first outlet to the first inlet through the first fuel passage.

13. The fuel delivery system of claim 12, wherein the fuel pump further includes:
   a second fuel passage interposed between the first inlet and the second outlet, and being configured to direct at least a portion of the second fuel flow from the second outlet to the first inlet; and
   a second pressure relief valve associated with the second fuel passage and being configured to selectively allow or inhibit the portion of the second fuel flow to be directed from the second outlet to the first inlet through the second fuel passage.

14. The fuel delivery system of claim 13, wherein the fuel pump further includes a third fuel passage fluidly connecting the first inlet with the second inlet.

15. The fuel delivery system of claim 1, wherein the fuel pump further includes a solenoid valve configured to selectively control the second fuel flow.

16. A method of supplying fuel to a combustion engine and an exhaust treatment device, the method comprising:
   generating a first rotational output and directing the first rotational output to create a first flow of pressurized fuel having a first pressure and a first flow rate;
   generating a second rotational output and directing the second rotational output to create a second flow of pressurized fuel having a second pressure and a second flow rate, wherein the second rotational output is different than the first rotational output, and wherein the second pressure is different from the first pressure, and wherein the second flow rate is different from the first flow rate;
   directing the first flow of pressurized fuel to the combustion engine; and
   directing the second flow of pressurized fuel to the exhaust treatment device.

17. The method of claim 16, further including selectively restricting the second flow of pressurized fuel directed to the exhaust treatment device.

18. The method of claim 17, wherein selectively restricting the second flow of pressurized fuel includes selectively redirecting a portion of the second flow of pressurized fuel to the combustion engine.

19. The method of claim 16, further including relieving pressures of the first and second flows of pressurized fuel when the pressures exceed first and second predetermined pressures respectively.

20. A pump, comprising:
   a first inlet;
   a second inlet;
   a first outlet;
   a second outlet;
   a first pumping chamber;
   a first gear set disposed within the first pumping chamber and being configured to generate a first flow at a first pressure and a first flow rate, and to direct the first flow to the first outlet;
   a second pumping chamber separated from the first pumping chamber;
   a second gear set disposed within the second pumping chamber and being configured to generate a second flow at a second pressure and a second flow rate different from the first pressure and the first flow rate, and to direct the second flow to the second outlet;

a pump drive shaft operably coupled with the first and the second gear sets, and configured to cause a rotation of the first and second gear sets;

a solenoid valve configured to selectively control the second flow;

a first bypass passage interposed between the first inlet and the first outlet;

a first pressure relief valve configured to reduce a pressure of the first flow;

a second bypass passage interposed between the second outlet and at least one of the first and second inlets; and a second pressure relief valve configured to reduce a pressure of the second flow.

* * * * *